3,211,683
SIZING EMULSIONS COMPRISING A PETROLEUM RESIN-MALEIC ANHYDRIDE ADDITION PRODUCT AND ROSIN
Morimasa Arakawa, Higashiku, Osaka, Koichi Hirooka, Nara, Takao Kosugi, Nadaku, Kobe, and Masaaki Kawano, Jyotoku, Osaka, Japan, assignors to Arakawa Rinsan Kagaku Kogyo Kabushiki Kaisha, Osaka, Japan, a corporation of Japan
No Drawing. Filed Mar. 8, 1960, Ser. No. 13,422
Claims priority, application Japan, Dec. 15, 1959, 34/39,239
4 Claims. (Cl. 260—27)

The present invention relates to sizing agents for paper-making and more particularly to sizing agents in emulsion form, the main raw material of which is a synthetic resin of petroleum origin (hereafter designated as petroleum resin) obtained from the heavy bottom resulting from the cracking distillation of petroleum.

The present invention relates also to processes for the production of sizing agents as described above.

An object of this invention is to provide an emulsified product having a superior efficiency as a sizing agent for paper-making.

Another object of this invention is to provide processes in which an emulsified product having superior efficiency as sizing agents for paper-making may be easily and economically produced from petroleum resin which is very cheap and abundant as a resin material.

Hitherto, rosin has been used, in general, as a main raw material for the production of sizing agent for paper-making. Recently rosin has become short in supply thereby causing the price of the sizing agent produced from the rosin to increase.

From our investigations we have found that petroleum resin is substantially similar to rosin in physical properties such as appearance, softening point and the like and that the former is vastly superior in water repellency to the latter so that it can be utilized as a raw material for the production of sizing agent for paper-making. However, the petroleum resin is sufficiently different in chemical properties from the rosin that it does not yield a sizing agent having the required fixing on paper pulp by simple emulsification. As the result of our studies to improve the fixing property of petroleum resin we have successfully prepared a sizing agent having more excellent sizing efficiency than that of usual rosin sizing agent.

The petroleum resin may be obtained from petroleum by polymerization of hydrocarbons having several unsaturated (double) bonds which are produced as a by-product in the course of the cracking distillation of petroleum. The composition of the petroleum resin may be somewhat varied owing to the kind of crude oil and to the several conditions under which the cracking, distillation and separation of petroleum are carried out. In general, said petroleum resin is a material obtained from the polymerization of mixtures of aliphatic and monocyclic aromatic compounds having some unsaturated (double) bonds, a softening point of 30–130° C., preferably 60–100° C., a color (rosin standard) X–D, particularly N–K, a specific gravity ($d_{15}^{15}$) 0.9–1.20, particularly 1.06–1.08, an acid value less than 1.0, and an iodine value (Wijs method) 30–230, particularly 50–100.

The petroleum resin is insoluble in an aqueous alkaline solution unlike the rosin. In order to produce a sizing agent from the petroleum resin, therefore, it is required to convert said resin into an emulsified product by homogeneously dispersing it in water in a finely divided form. According to the present invention the petroleum resin is converted to $\alpha,\beta$-unsaturated acid addition product, to which rosin or $\alpha,\beta$-unsaturated acid addition product of rosin is added and a part or the whole of the mixture is saponified with alkali and dispersed in water to improve the emulsifying property and fixing property on the paper pulp. By this procedure a sizing agent having such a superior sizing efficiency as mentioned below can be readily and economically produced on a commercial scale. It is not always necessary to utilize the entire quantity of petroleum resin to produce its $\alpha,\beta$-unsaturated acid addition product. That is to say, in this invention the $\alpha,\beta$-unsaturated acid addition product containing a certain proportion of petroleum resin can also be effectively used. Said addition product containing the resin may be obtained by leaving a part of the petroleum resin as is, in the case in which the addition product therefrom is produced or by separately adding fresh petroleum resin to the $\alpha,\beta$-unsaturated acid addition product of the prepared petroleum resin.

According to the present invention, when the petroleum resin is subjected to heat with $\alpha,\beta$-unsaturated acid or a compound producing $\alpha,\beta$-unsaturated acid, a petroleum resin having at least one carboxyl group may be produced by the addition reaction which is assumed to result from the unsaturated bonds. Among the $\alpha,\beta$-unsaturated acids maleic anhydride is suitable. However, maleic acid, fumaric acid, itaconic acid and the like may also be advantageously used. Furthermore, citric acid and the like may be utilized for producing $\alpha,\beta$-unsaturated acid by heating.

As already mentioned above, said petroleum resin having a carboxyl group is mixed with rosin or $\alpha,\beta$-unsaturated acid addition product of rosin while heating and stirring. The proportion of said resin and rosin may be freely selected at will. The more the amount of petroleum resin used the better the sizing efficiency and the fluidity, accompanied by improved handling and transportation.

The effective compositions of the sizing agent of this invention are as follows:

| | Parts |
|---|---|
| Petroleum resin (softening point 60–70° C.) | 50–90 |
| Rosin | 10–50 |
| $\alpha,\beta$-Unsaturated acid | 1–10 |

The resin mixture thus obtained is mixed with 10–40% hot alkali solution under melting and stirring and then with hot water, whereupon a white emulsified product may be obtained. Cooling of this emulsified product gives a sizing agent the viscosity of which is quite low, and the emulsion is stable for a long period of time. For alkalis to be used in this case, usual basic substances of organic and inorganic series may effectively be used in such amount as required to neutralize a part or whole of acids contained in aforesaid resin mixture.

The invention will be explained by way of examples but not be limited by them.

EXAMPLE 1

80 kg. of the pale yellowish petroleum resin, softening point 65° C., resulted from polymerization of heavy bottom of cracking distillation of petroleum and 4 kg. of maleic anhydride are caused to react with each other at a temperature of 200° C. for eight hours. The reaction product is mixed with 20 kg. of gum rosin and again heated at a temperature of 200° C. for about one hour and then cooled to 100° C. The molten product is added to hot alkali solution of 7.1 kg. of caustic potash in 28 kg. of water while stirring, then the emulsified product is diluted with 60 kg. of hot water, whereupon a white emulsified product having a 50% resin content is obtained. This product is then cooled to room temperature.

EXAMPLE 2

50 kg. of brownish petroleum resin, softening point 70° C., obtained from the polymerization of heavy bottom of cracking distillation of petroleum and 2 kg. of maleic anhydride are caused to react with each other at a temperature of 200° C. for eight hours. The reaction product is combined with 15 kg. of gum rosin and is heated at a temperature of 200° C. for about one hour. To this mixture, 35 kg. of the above mentioned untreated petroleum resin are homogeneously mixed and the temperature of this mixture is adjusted to 100° C. Hot alkali solution of 4.3 kg. of caustic potash in 17 kg. of water is added to the molten resin mixture while stirring. Dilution of the mixture thus obtained with 81 kg. of hot water gives a white emulsified product having a 50% resin content. This product is then cooled to room temperature.

EXAMPLE 3

88 kg. of brownish petroleum resin, softening point 70° C., obtained from the polymerization of heavy bottom of cracking distillation of petroleum, 12 kg. of tall oil rosin and 1.5 kg. of maleic anhydride are caused to react with each other at a temperature of 200° C. for eight hours and the resulting resin is then cooled to 100° C.

The molten resin thus obtained is poured into 16.5 kg. of hot aqueous alkali solution containing 3.3 kg. of caustic potash while stirring and then is diluted with 85 kg. of hot water, whereupon a white emulsified product containing 50% solid matter is obtained. This product is then cooled to room temperature.

The results of sizing tests with the sizing agents produced in Examples 1, 2 and 3 will be described in the following table. Hitherto known rosin sizing agent and 5% maleic modified rosin sizing agent are adopted as controls.

Each sizing agent is added to a beater containing a bleached sulfite pulp which is beaten to 28° SR. Then aluminum sulfate is added to bring the mixture to pH 4.5. From the stock thus produced, three sheets of paper are each formed in the usual manner. Sizing degree (second) is measured by Stöckigt method (JIS P–8122) at six positions of each sheet of paper. The numerals shown in the following table are the average obtained at eighteen positions. The basis of weight of each paper to be tested in 62.8 g./m.²

Table

| Amount of sizing agent added to pulp | 0.5% | 1.0% | 1.5% | 2.0% | 3.0% |
|---|---|---|---|---|---|
| | Sec. | Sec. | Sec. | Sec. | Sec. |
| Sizing degree: | | | | | |
| Rosin sizing agent | 26.5 | 39.5 | 43.3 | 45.1 | 45.6 |
| Sizing agent in Example 1 | 36.5 | 44.7 | 50.1 | 56.3 | 63.0 |
| Sizing agent in Example 2 | 34.0 | 43.5 | 49.3 | 56.0 | 63.8 |
| Sizing agent in Example 3 | 31.8 | 42.2 | 48.6 | 53.5 | 57.4 |
| Maleic modified rosin sizing agent | 40.3 | 44.8 | 47.1 | 47.9 | 48.2 |

As shown in the above table, the sizing agents of this invention exhibit higher sizing efficiency than that of hitherto known rosin sizing agents and do not produce any foaming in the course of paper-making and do not stain the paper-making machine. Furthermore the sizing agents of this invention can be applied on various kinds of paper without decreasing the paper strength.

What we claim is:

1. A process for the production of a sizing agent for paper making, said process comprising reacting 1–10 parts of a compound selected from the group consisting of maleic anhydride, maleic acid, fumaric acid, and itaconic acid and mixtures thereof with 50–90 parts of a petroleum resin having a softening point of 30–130° C., an iodine value (Wijs method) of 30–230, and a specific gravity $d_{15}^{15}$ of 0.9–1.2, adding 10–50 parts of a substance selected from the group consisting of rosin and $\alpha,\beta$-unsaturated dicarboxylic acid addition products of said rosin to the thus obtained reaction product, saponifying the thus produced mixture with an aqueous solution of alkali while stirring, and dispersing the saponified product in water.

2. A process as claimed in claim 1, comprising adding fresh petroleum resin to the said obtained reaction product.

3. A sizing agent for paper making, consisting essentially of an aqueous emulsified product which is at least partially neutralized and is constituted by a mixture of (1) a substance selected from the group consisting of rosin and $\alpha,\beta$-unsaturated dicarboxylic acid addition products of said rosin, and (2) an addition product of petroleum resin, the latter product being obtained by the reaction of a compound selected from the group consisting of maleic anhydride, maleic acid, fumaric acid, and itaconic acid with petroleum resin having a softening point of between 30 and 130° C., an iodine value (Wijs method) of between 30 and 230 and a specific gravity $d_{15}^{15}$ of between 0.9 and 1.2.

4. An agent as claimed in claim 3 wherein said petroleum resin is present in an amount between 50 to 90 parts, said substance selected from the group consisting of rosin and $\alpha,\beta$-unsaturated dicarboxylic acid addition products of said rosin being present in an amount between 10 and 50 parts and said $\alpha,\beta$-unsaturated dicarboxylic acid is present in an amount between 1 and 10 parts.

References Cited by the Examiner

UNITED STATES PATENTS

| 1,948,442 | 2/34 | Ellis | 162—168 |
| 2,380,456 | 7/45 | Maier et al. | 280—23 |
| 2,933,468 | 4/60 | Aldridge et al. | 260—78.4 |
| 2,992,963 | 7/61 | Nagel et al. | 117—115 |
| 3,005,800 | 10/61 | Powers et al. | 260—78 |

FOREIGN PATENTS

| 509,084 | 1/55 | Canada. |

LEON J. BERCOVITZ, Primary Examiner.

ALLEN M. BOETTCHER, ALPHONSO D. SULLIVAN, DONALD E. CZAJA, Examiners.